(12) United States Patent
Halbritter et al.

(10) Patent No.: US 11,774,555 B2
(45) Date of Patent: Oct. 3, 2023

(54) MEASURING SYSTEM, USE OF AT LEAST ONE INDIVIDUALLY OPERABLE LED LIGHTING UNIT AS A SENDER UNIT IN A MEASURING SYSTEM, METHOD FOR OPERATING A MEASURING SYSTEM AND LIGHTING SOURCE HAVING A MEASURING SYSTEM

(71) Applicant: OSRAM OLED GmbH, Regensburg (DE)

(72) Inventors: Hubert Halbritter, Dietfurt (DE); Stefan Groetsch, Bad Abbach (DE)

(73) Assignee: OSRAM OLED GMBH, Regensburg (DE)

( * ) Notice: Subject to any disclaimer, the term of this patent is extended or adjusted under 35 U.S.C. 154(b) by 464 days.

(21) Appl. No.: 16/951,956

(22) Filed: Nov. 18, 2020

(65) Prior Publication Data

US 2021/0072356 A1 Mar. 11, 2021

Related U.S. Application Data

(63) Continuation of application No. 15/706,581, filed on Sep. 15, 2017, now abandoned.

(30) Foreign Application Priority Data

Sep. 15, 2016 (DE) .......................... 102016117388.6

(51) Int. Cl.
*G01S 7/48* (2006.01)
*G01S 7/481* (2006.01)
(Continued)

(52) U.S. Cl.
CPC .............. *G01S 7/4814* (2013.01); *G01S 7/10* (2013.01); *G01S 7/484* (2013.01)

(58) Field of Classification Search
None
See application file for complete search history.

(56) References Cited

U.S. PATENT DOCUMENTS

2003/0210609 A1  11/2003  Jeffryes
2008/0309914 A1  12/2008  Cantin et al.
(Continued)

FOREIGN PATENT DOCUMENTS

DE         4137068 A1    6/1993
DE    102006044794 A1    3/2008
(Continued)

OTHER PUBLICATIONS

McKendry et al.,"Individually Addressable AlInGan Micro-LED arrays With CMOS Control and Subnanosecond Output Pulses" IEE Photonics Technology Latters, vol. 21, Nr. 12, Jun. 15, 2009.
(Continued)

*Primary Examiner* — Hovhannes Baghdasaryan
(74) *Attorney, Agent, or Firm* — ArentFox Schiff LLP

(57) ABSTRACT

Provided is a measuring system (1), which comprises a sender unit (10) with at least one individually operable LED lighting unit (12) with a luminous area which has a characteristic longitudinal extent (107) of less than or equal to 100 µm and/or a surface area of less than or equal to $10^4$ µm², wherein the LED lighting unit (12) is configured to emit at least one light pulse as a sender signal (11) during operation, and comprises the one receiver unit (20) with at least one detector unit (22) for receiving a return signal (21), which comprises at least a part of the sender signal (11) reflected by an external object. Furthermore, use of at least one individually operable LED lighting unit as a sender unit in a measuring system, a method for operating a measuring system and a lighting source having a measuring system are provided.

17 Claims, 9 Drawing Sheets

Figure 1A:
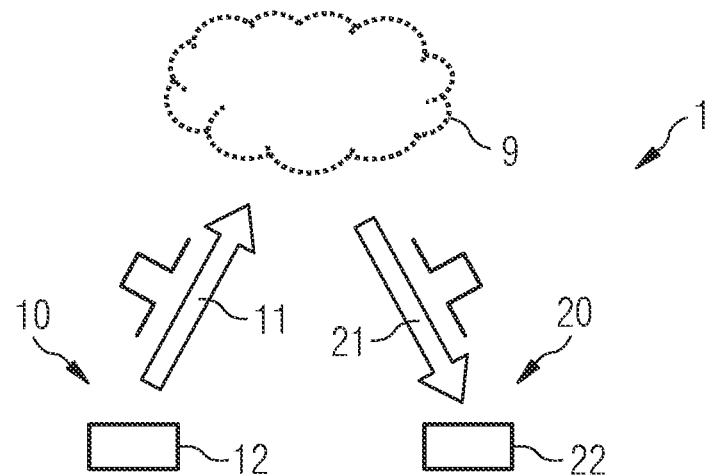

(51) Int. Cl.
    *G01S 7/484*    (2006.01)
    *G01S 7/10*     (2006.01)

(56) References Cited

U.S. PATENT DOCUMENTS

| | | |
|---|---|---|
| 2009/0289263 A1 | 11/2009 | Duong et al. |
| 2010/0191418 A1* | 7/2010 | Mimeault ............ H05B 47/125 |
| | | 356/4.01 |
| 2010/0245802 A1* | 9/2010 | Madhani ................ H05B 45/44 |
| | | 315/186 |
| 2011/0073838 A1 | 3/2011 | Khan et al. |
| 2015/0325598 A1 | 11/2015 | Pfeuffer et al. |
| 2015/0333047 A1 | 11/2015 | Pfeuffer |
| 2016/0262032 A1 | 9/2016 | Kim |

FOREIGN PATENT DOCUMENTS

| | | |
|---|---|---|
| DE | 102015106635 A1 | 11/2016 |
| WO | 2009100358 A1 | 8/2009 |
| WO | 2014096157 A1 | 6/2014 |

OTHER PUBLICATIONS

Haas, "LiFi Technologies" httpL/www.lifi.eng.ed.ac.uk/sites/edit. lifi.eng.ed.ac.ac.uk/files/images/news/Proffesor-Haas-LiFi-Tichnologies. png.

* cited by examiner

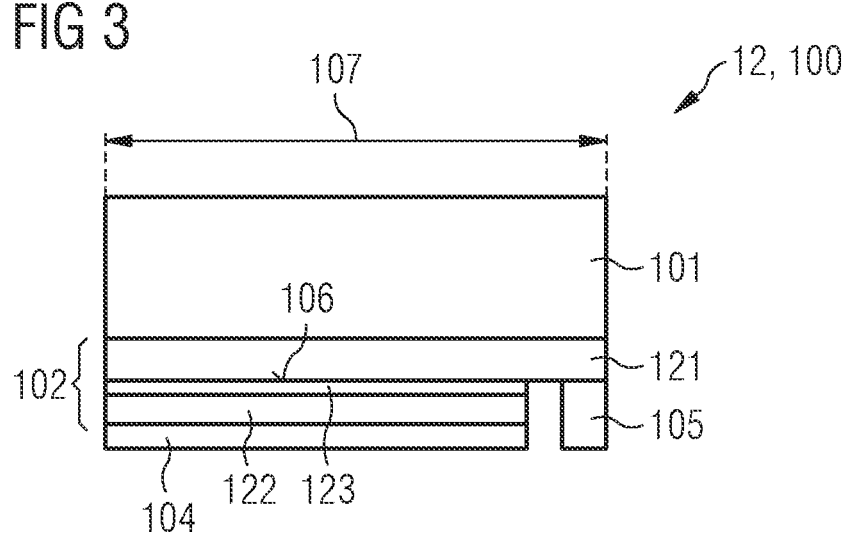
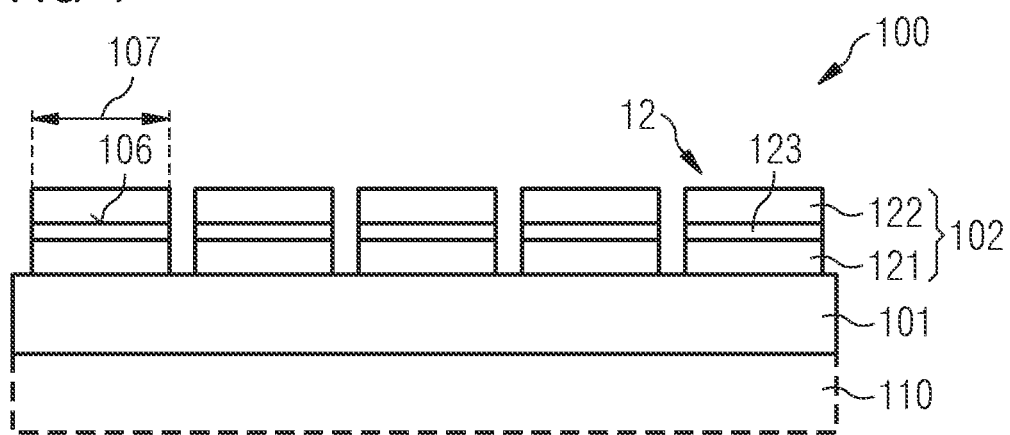
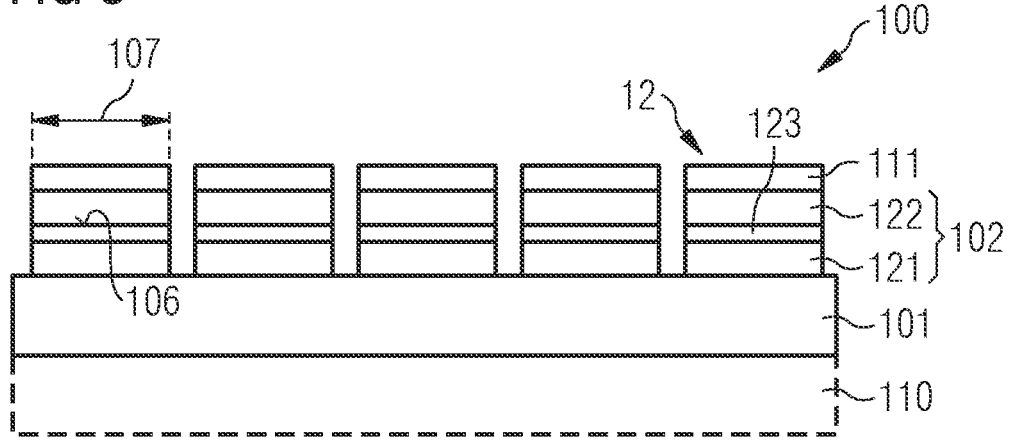

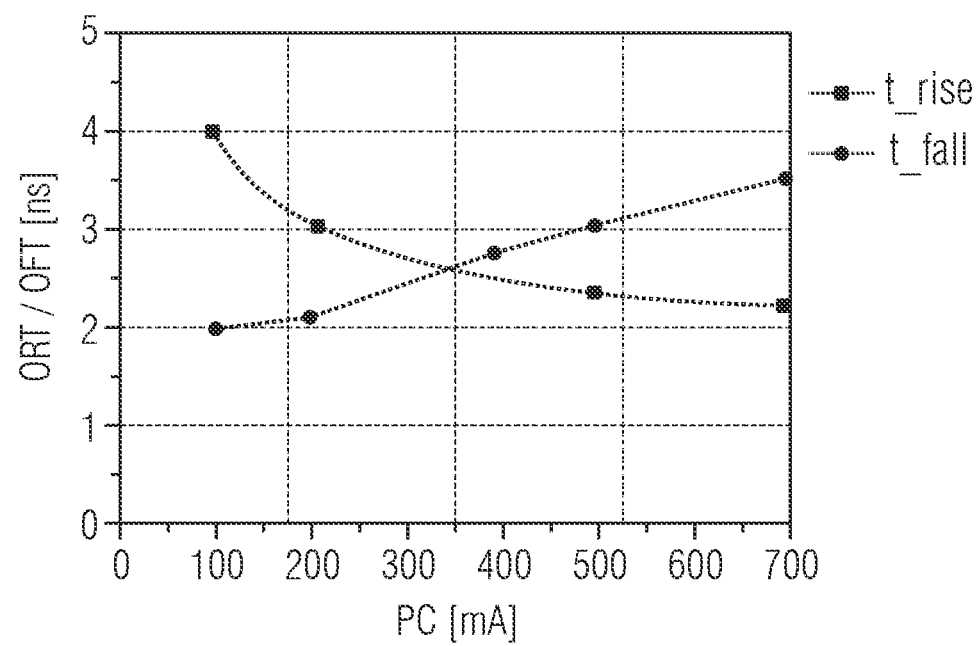

MEASURING SYSTEM, USE OF AT LEAST ONE INDIVIDUALLY OPERABLE LED LIGHTING UNIT AS A SENDER UNIT IN A MEASURING SYSTEM, METHOD FOR OPERATING A MEASURING SYSTEM AND LIGHTING SOURCE HAVING A MEASURING SYSTEM

CROSS-REFERENCE TO RELATED APPLICATIONS

This application is a Continuation of U.S. application Ser. No. 15/706,581 filed Sep. 15, 2017, which claims priority to German Application No. 102016117388.6 the benefit of Provisional Application No. 62/093,694 filed Sep. 15, 2016, the disclosures of all of which are hereby incorporated by reference in their entirety.

A measuring system, use of at least one individually operable light-emitting diode (LED) lighting unit as a sender unit in a measuring system, method for operating a measuring system and a lighting source having a measuring system are provided.

Lasers are used as light sources in many optical measuring processes. In the method known as LIDAR ("light detection and ranging"), for example, which is used for the optical measurement of distances and velocities and for atmospheric parameter telemetry, a laser is used to output light pulses. However, the extremely stable operation of the laser required to that end poses complex technical requirements. In addition, suitable laser light sources may require very high operating currents.

At least one object of certain embodiments is to provide a measuring system. Further objects of certain embodiments consist in providing a use of at least one individually operable LED lighting unit as a sender unit in a measuring system, a method for operating a measuring system and a lighting source having a measuring system.

The objects are achieved by subjects and methods according to the independent claims. Advantageous embodiments and developments of the subjects and methods are indicated in the dependent claims and also result from the following description and the drawings.

According to at least one embodiment, a measuring system comprises a sender unit and a receiver unit. The sender unit is provided and configured to emit at least one light pulse as a sender signal during operation. Depending on the intended application, a light pulse may have the form of a square-wave pulse, a saw-tooth pulse, a triangular pulse, of a half-wave or a combination thereof. The receiver unit is provided and configured to receive a return signal which comprises at least a part of the sender signal reflected by an external object. Accordingly, the return signal may correspond to a sender signal which is e.g. attenuated at least with respect to some spectral components and/or which is e.g. at least partially frequency-shifted, what can be caused by interactions of the sender signal with the object.

According to at least one further embodiment, in a method for operating such a measuring system, the sender unit emits at least one light pulse as a sender signal. The receiver unit detects the return signal. For example, the method can be used to determine one or more parameters with respect to the sender signal and/or the return signal. The one or multiple parameters can e.g. be selected from a time difference between the sender signal and the return signal, which can correspond to a so-called "time of flight" measuring process, a wavelength shift between the sender signal and the return signal, a spectral change between the sender signal and the return signal. One or more state variables with respect to the object at least partially reflecting the sender signal can be derived from one or more of the parameters determined by evaluation, e.g. a distance and/or a velocity and/or at least one or multiple velocity components and/or at least a part of a chemical and/or physical composition. Furthermore, the measuring system can comprise an evaluation unit configured and provided for parameter determination. In particular, the measuring system may have properties and features of a LIDAR system or be a LIDAR system.

According to at least one further embodiment, a lighting source comprises such a measuring system, wherein the sender unit comprises at least two operating states. One operating state is configured to perform the stated method, while another operating state is configured to continuously emit light for ambient lighting. In particular, the lighting source may be part of a headlamp, e.g. an automobile headlamp, or a flashlight lighting device, so that on the one hand, the measuring system can be used for the method for operating the measuring system described herein, in which the sender unit sends out at least one light pulse as a sender signal and the receiver unit detects a return signal. On the other hand, the sender unit or at least a part thereof can be used for ambient lighting in the context of the widespread use of a lighting source. To that end, the sender unit can be operated in such a way that light is continuously emitted.

According to another embodiment, the sender unit comprises at least one individually operable LED lighting unit, which is configured and provided to emit at least one light pulse as a sender signal during operation. "Individually operable" means that the LED lighting unit can be activated and deactivated for the radiation of light independently of all other potential LED lighting units of the sender unit. In the case that the measuring system is used in an above-described lighting source, the LED lighting unit can also be provided and configured to continuously generate and emit light in an operating state provided for ambient lighting.

According to at least one further embodiment, at least one individually operable LED lighting unit is used as a sender unit in a measuring system. Furthermore, the at least one individually operable LED lighting unit can be used in a method for operating a measuring system. Furthermore, the at least one individually operable LED lighting unit can be used as a sender unit in a measuring system in a lighting source.

The features and embodiments described above and in the following just as well apply to the measuring system, the lighting source having the measuring system, the method for operating the measuring system and the use of the at least one individually operable LED lighting unit in a measuring system, a lighting source and in methods for operating these.

According to a further embodiment, the at least one individually operable LED lighting unit, hereinafter also referred to as "lighting unit", is part of an LED or formed by an LED. The LED can in particular be formed by a light-emitting semiconductor chip, also referred to as LED chip, having a semiconductor layer sequence with an active layer configured and provided to generate light during operation of the LED.

In the case that the lighting unit is formed by an LED, this means in other words that an LED chip forms the lighting unit as a whole and is used, in its entirety, for the generation of the at least one light pulse. If the lighting unit is formed by a part of an LED, this can in particular mean that the LED comprises a plurality of individually operable lighting units by a segmented configuration of at least a part of the semiconductor layer sequence. In other words, the LED comprises individually controllable lighting segments forming the lighting units of the LED. Such an LED is also referred to as segmented LED. Segmented LEDs are described e.g. in the specifications US 2015/0325598 A1 and US 2015/0333047 A1, the disclosure of which is incorporated herein entirely by reference.

According to another embodiment, the lighting unit has a characteristic longitudinal extent of less than or equal to 100 µm. In particular, the lighting unit can have a luminous area with a characteristic longitudinal extent of less than or equal to 100 µm. As an alternative or in addition, the lighting unit may have a surface area of less than or equal to $10^4$ µm$^2$. In particular, the lighting unit can have a luminous area of less than or equal to $10^4$ µm$^2$. In this case, the longitudinal extent and the surface area are measured in a plane, which is parallel to a main extension plane of the active layer of the semiconductor layer sequence and thus perpendicular to an arrangement direction of the layers of the semiconductor layer sequence. Here, the luminous area refers to the cross-sectional area of the active layer of the lighting unit, through which light is generated and radiated during operation, in a plane parallel to the main extension plane of the active layer. In the case of a surface that corresponds to a polygonal geometric shape, the characteristic longitudinal extent can e.g. be an edge length of the polygonal geometric shape. Furthermore, the characteristic longitudinal extent can be a maximum extent of the surface of the lighting unit in a direction parallel to the main extension plane of the active layer, i.e. for example a surface diagonal or a diameter. In particular, the lighting unit can have a surface, in particular a luminous area, with a polygonal, in particular rectangular basic shape. In this case, the characteristic longitudinal extent can in particular be an edge length of the polygonal, in particular rectangular basic shape. If the LED lighting unit is formed by an LED chip, the stated dimensions can in particular apply to the chip dimensions. In the case that the LED lighting unit is formed by a segment of a segmented LED chip, the stated dimensions may therefore in particular apply to the dimensions of the corresponding segment.

The present invention makes use of the knowledge that the maximum current density, with which an LED or an LED segment can be operated, increases as the dimensions decrease. Therefore, the smaller the surface area and thus in conjunction the characteristic length of the lighting unit, the higher can be the maximum current density with which the lighting unit can be operated. For example, experiments have shown that an LED chip with a surface area of approximately 1 mm$^2$ can be operated typically with a maximum direct current in the range or 1 Ampere (A), while a corresponding quadratic LED chip with an edge length of approximately 200 µm can be operated with a maximum direct current of approximately 70 mA. Thus, in this specific example, it is shown that the maximum current density in the case of the smaller LED chip is greater by a factor of 1.5 to 2, for example. Furthermore, it turned out that a higher current density can lead to shorter switching times and thus to a higher bandwidth in the generation of light pulses. This behavior is particularly advantageous for the measuring system described herein, since the sender unit can be operated then with a high bandwidth with respect to a sender signal frequency and a light pulse length. In particular, it can be advantageous when the light pulse generated by the lighting unit has a pulse length of less than or equal to 10 ns, which can be achieved by the stated dimensions of the LED lighting unit. In other words, a bandwidth of greater than or equal to 100 MHz can be achieved by means of the described lighting unit. Such pulse lengths and bandwidths are particularly required for LIDAR systems, for example.

According to another embodiment, the sender unit comprises a plurality of LEDs each having at least one LED lighting unit. Here, each of the plurality of LEDs can form exactly one LED lighting unit, for example. Referring to the above described preferred size of the surface and the longitudinal extent of the LED lighting unit, this can particularly also mean that each of the plurality of LEDs of the sender unit comprises an above-described size of the surface are and/or longitudinal extent. Furthermore, the sender unit may also comprise one or a plurality of segmented LEDs, wherein preferably each of the luminous segments is an individually operable LED lighting unit with a previously described dimension of the surface size and/or the longitudinal extent.

According to another embodiment, the sender signal comprises a plurality of successively generated light pulses. Thus, the sender signal can comprise a so-called pulse train with e.g. greater than or equal to two light pulses and/or greater than or equal to five light pulses and/or greater than or equal to ten light pulses and/or greater than or equal to 50 light pulses. Here, the number of the light pulses and the time interval between in each case two successive light pulses can be preferably selected in such a way that the sender signal has an overall time duration of less than or equal to 100 µs. The time interval between successive light pulses or pulse trains can e.g. be selected to have a size that a return signal associated with a light pulse or pulse train is detected by the receiver unit before the next light pulse or pulse train of the sender signal is emitted. In other words, the time interval between two light pulses or two pulse trains is greater than the sum of the runtimes of the sender signal to the object and of the return signal to the receiver unit. As an alternative, light pulses or pulse trains can be emitted with a time interval that is shorter than the sum of the runtimes of the sender signal to the object and of the return signal to the receiver unit. In this case, it can be particularly advantageous if successive light pulses or pulse trains are detected by different detector units of the receiver unit as it is described below.

If the sender unit comprises a plurality of individually operable LED lighting units, the sender unit can be configured to successively emit light pulses during operation of various LED lighting units. In this case, the sender signal can comprise a plurality of light pulses, which are generated successively by at least two or multiple different LED lighting units. Here, the sender unit can comprise a plurality of LED lighting units, which emit in different solid angle ranges, so that a larger solid angle range can be covered with one and the same sender unit when compared to only one single light source. As a result, a suitable level control and targeted radiation of a target object to be measured can be achieved. As an alternative, it can also be possible that the sender unit comprises a plurality of LED lighting units emitting in a same solid angle range. As a result, it can be achieved that the individual LED lighting units are exposed to a lower thermal stress even in operation with a high current density, since different lighting units can be used for successive light pulses emitted into the same solid angle range. If multiple light pulses are emitted in a so-called burst mode successively from the same or from multiple LED lighting units in to the same solid angle range, the corresponding return signals can be summed-up, whereby an improvement of the signal-to-noise ratio can be achievable. Furthermore, it can also be possible that a plurality of lighting units is used for generating in each case one or multiple light pulses at a time, which are emitted in a same or in different solid angle ranges.

According to another embodiment, the receiver unit comprises exactly one detector unit, which is used for the detection of a plurality of return signals. This can particularly mean that each light pulse or pulse train is individually evaluated by the detector unit and a new light pulse or pulse train is emitted from the sender unit only after evaluation. Here, as described above, the light pulses can be emitted into a same or into different solid angle ranges. As an alternative, the receiver unit comprises a plurality of detector units for the detection of a plurality of return signals. As a result, it can e.g. be possible that a plurality of light pulses or pulse trains is emitted at the same time or immediately one after the other into different solid angle ranges and corresponding return signals can be evaluated by the plurality of the detector units simultaneously or essentially simultaneously or at least independently of the signal runtime from the sender unit to the receiver unit. The one or multiple detector units can preferably be formed by one or multiple photodiodes or photo diode segments or by a CMOS sensor. In particular, the receiver unit can also comprise or be a time-of-flight camera or a high-speed global shutter camera.

According to another embodiment, the sender unit comprises a wavelength conversion substance, which is provided and configured to convert at least part of a primary light generated during operation by the at least one LED lighting unit into secondary light different from the primary light. In particular, use of a wavelength conversion substance can be advantageous if the measuring system is used in a lighting source which, as described above, has a lighting operating state for the purpose of ambient lighting, in which a certain illumination spectrum is desired, in addition to the measuring operating state. For example, the sender unit can be capable of generating white light by the wavelength conversion substance in connection with a blue-emitting lighting unit. It can be particularly advantageous here when the wavelength conversion substance has an excitation and deactivation time of in each case less than or equal to 10 ns, so that mixed-colored light pulses can be generated with a desired high bandwidth. In particular, a wavelength conversion substance on the basis of quantum dots may be suitable to that end. As an alternative, it can also be possible that the wavelength conversion substance has an excitation and/or deactivation time which is greater than 10 ns. This may result in that the wavelength conversion substance, which is based upon e.g. conventional ceramic and/or organic light-emitting substances, glows after in the generation of a preferred very short light pulse as described above. In this case, it can be advantageous when the receiver unit comprises a filter, which is impermeable to secondary light, so that merely the primary light directly generated by the lighting unit can be detected by the detector unit.

Alternatively or in addition to the generation of mixed light through the use of a wavelength conversion substance, the sender unit may also comprise LED lighting units emitting in different colors, e.g. at least one LED lighting unit emitting red light, at least one LED lighting unit emitting green light and at least one LED lighting unit emitting blue light.

Through the use of at least one individually operable LED lighting unit, the measuring system described herein can have the advantage that the use of a conventional pulsed laser can be omitted, which generates short pulses with a duration of e.g. nanoseconds. Moreover, an integration into an already existing lighting source such as a headlamp or a flashlight can be possible without that additional costs for a separate light source, such as a laser for the measuring system, are required. Thereby, it can be possible to use the light of the lighting source provided for ambient lighting or at least part thereof for the measuring system. While conventional LEDs in current lighting sources such as headlamps are not suitable to emit light pulses with a length in the range or several nanoseconds due to the chip size thereof, and thus usually have a typical bandwidth limitation of less than 20 MHz, it is characteristic for the measuring system here to use suitably small LED lighting units that can be operated with a correspondingly higher current density so that a desired high bandwidth can be achieved by the generation of fast light pulses in the range of several nanoseconds. Accordingly, the lighting source can comprise LED lighting units having the above-described small size so that parallel to the illumination functionality, sender signals generated by high, short current pulses can be used for the measuring system in an alternative operating mode.

According to another embodiment, the sender unit includes a storage capacitor and a current control unit. The at least one LED lighting unit of the sender unit is connected in series with the current control unit in one strand. The storage capacitor is connected in parallel to this strand.

The current control unit is configured to set an operating current of the at least one LED lighting unit in such a way that the at least one LED lighting unit is operated with direct current in a first operating state of the current control unit, in particular in an operating mode for continuously emitting light for ambient lighting, and is operated with a pulsed current in a second operating state of the current control unit, in particular in the alternative operating mode.

The current control unit can particularly have two control units connected in parallel. The control units can be a switch or a power source, respectively. By way of example, the first control unit is formed as a power source and the second control unit is formed as a FET switch. In the first operating state of the current control unit, the second control unit is switched to form an open-circuit, for example, and the direct current is impressed only be the power source. In the second operating state of the current control unit, the first control unit is switched to form an open-circuit, for example, and the pulsed current is impressed merely by a pulsed opening and closing of the FET switch.

In this context, the measuring system may in particular include a controller such as a microcontroller, which is coupled to the current control unit in a signalling manner and is configured to set the respective operating state.

According to another embodiment, the sender unit comprises multiple clusters including a plurality of LED lighting units. The LED lighting units are configured to emit, per cluster, in the same solid angle range. The LED lighting units of different clusters are further configured to emit in different solid angle ranges. In other words, those LED lighting units that emit in a same solid angle range are combined to form clusters, with these clusters each emitting in different solid angle ranges.

According to another embodiment, the cluster of the sender unit are interconnected in such a way that one strand is provided with a current control unit per cluster. The current control unit per cluster is connected in series with the LED lighting units of the cluster. The current control unit per cluster is configured to set the current for operating the LED lighting units of the respective cluster.

In particular, a different number of LED lighting units can be provided per solid angle range, which are operated by the respective current control units. Advantageously, this allows a lighting that achieves different illumination in different solid angle ranges. This can particularly be advantageously used in an asymmetric illumination, as it is strived for in vehicle head lamps.

Further advantages, advantageous embodiments and developments result from the exemplary embodiments described hereinafter in conjunction with the figures.

Figure 1B:
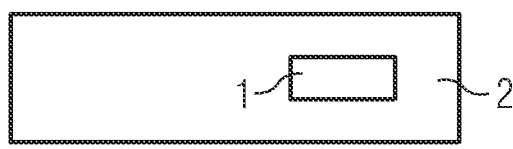
Figure 7A:
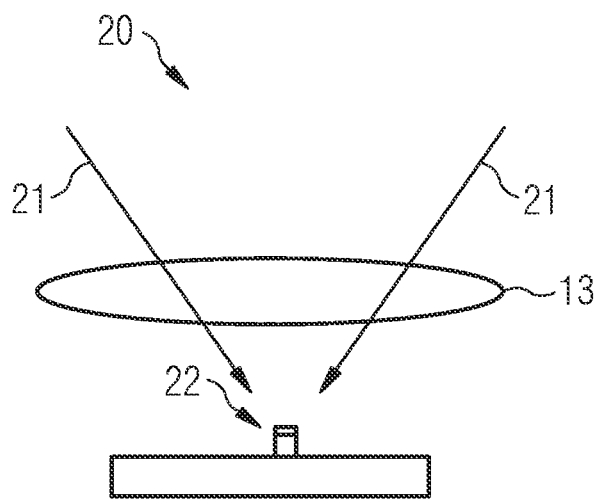
Figure 7B:
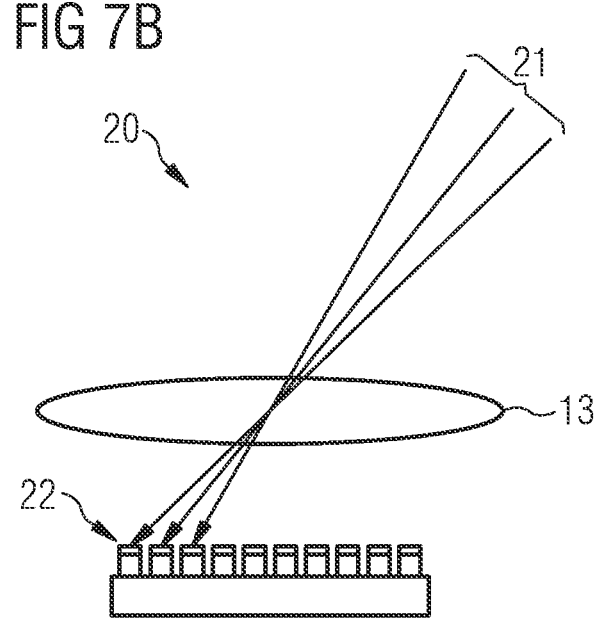
Figure 8A:
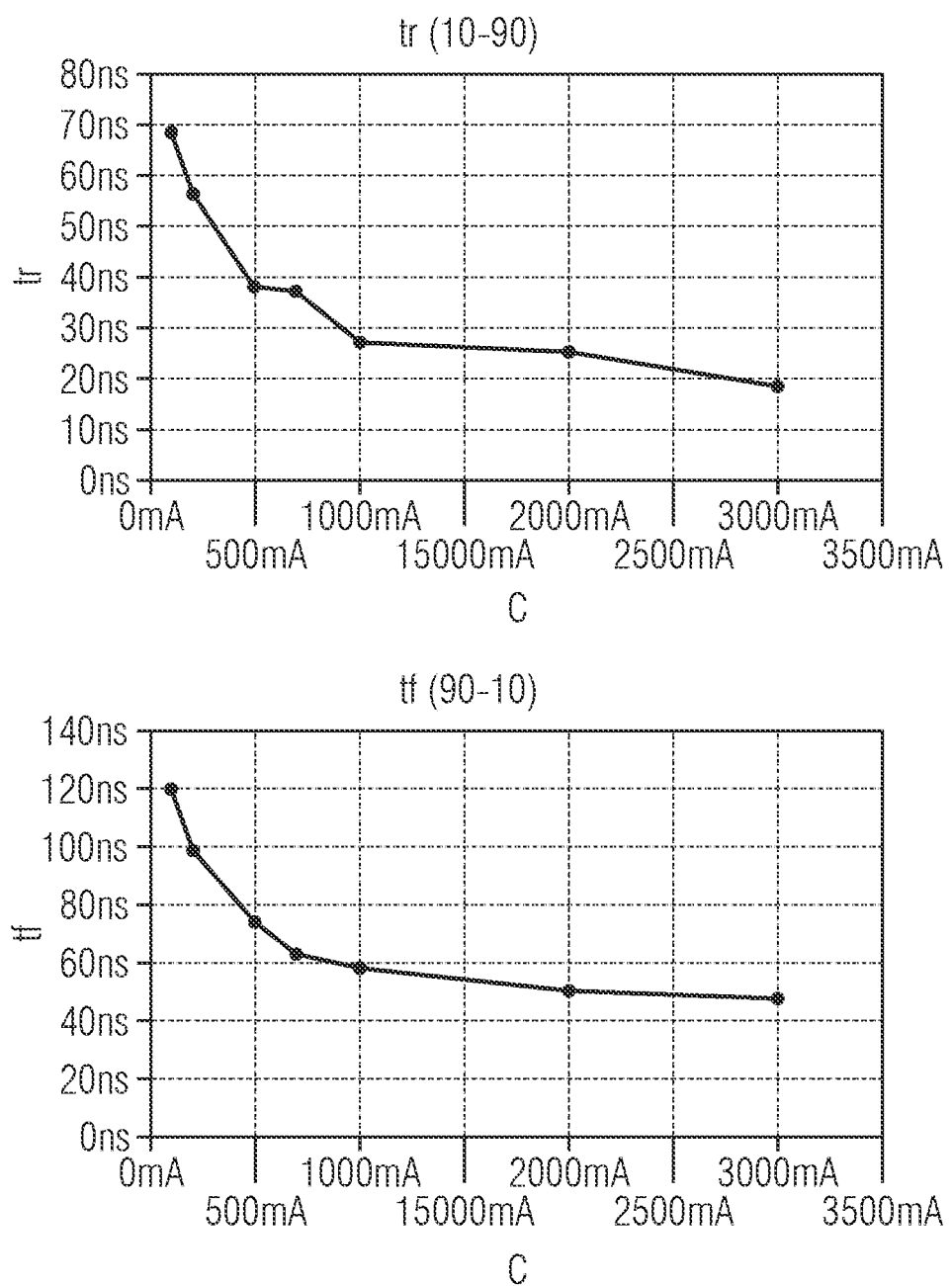
Figure 8B:
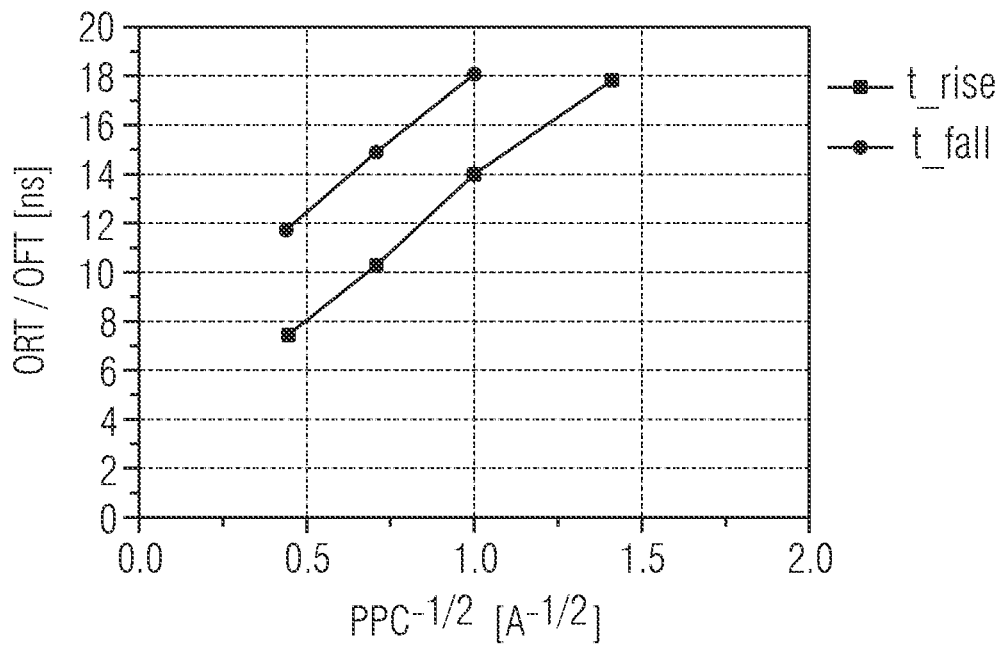
Figure 8C:
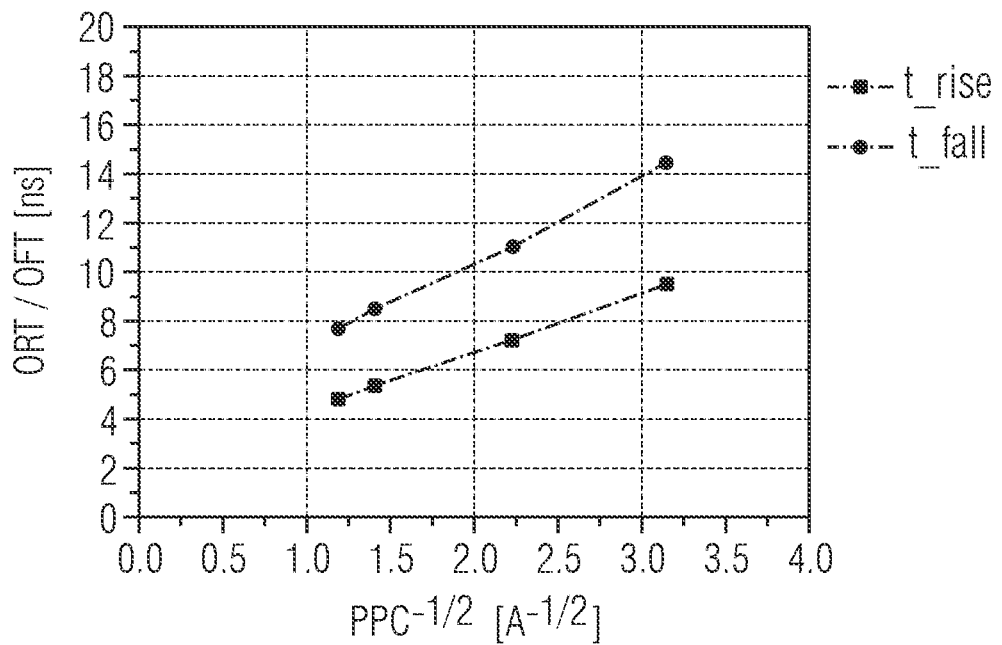
Figure 9:
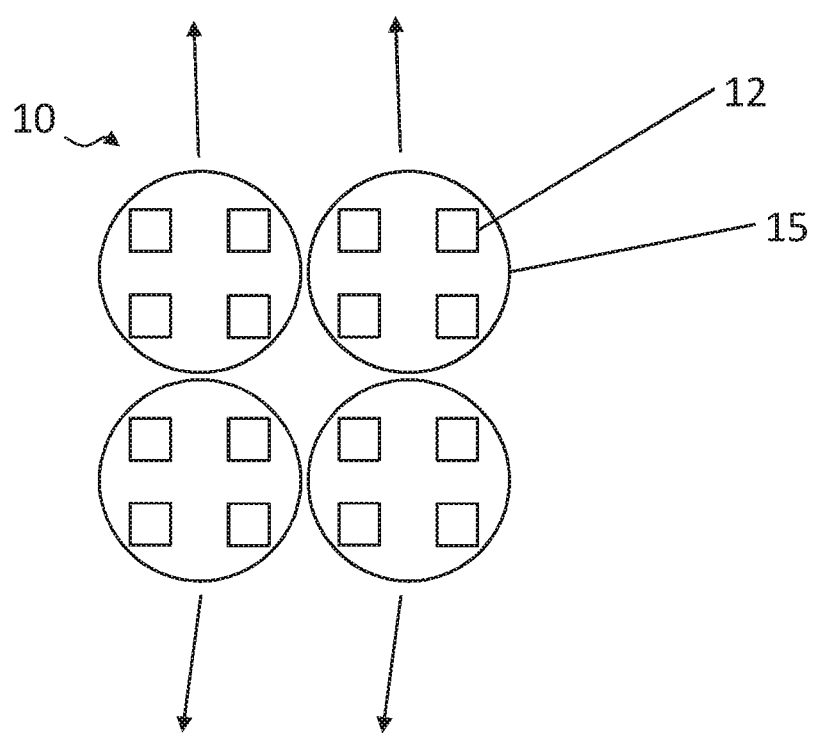
Figure 10A:
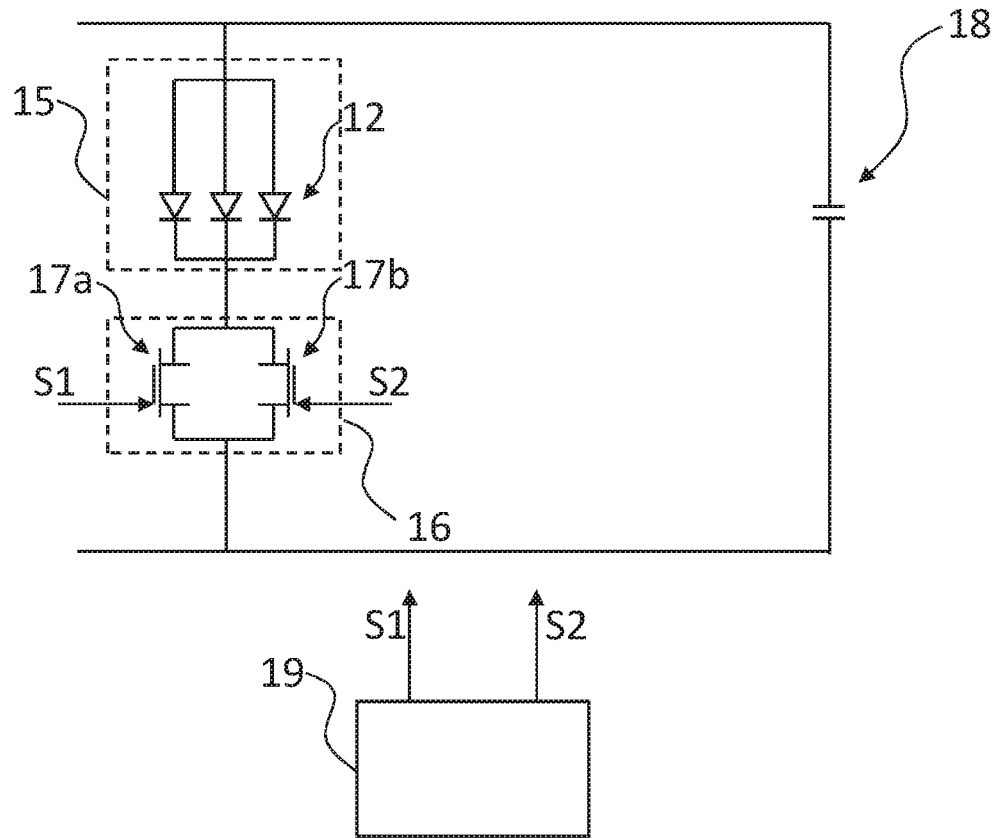
Figure 10B:
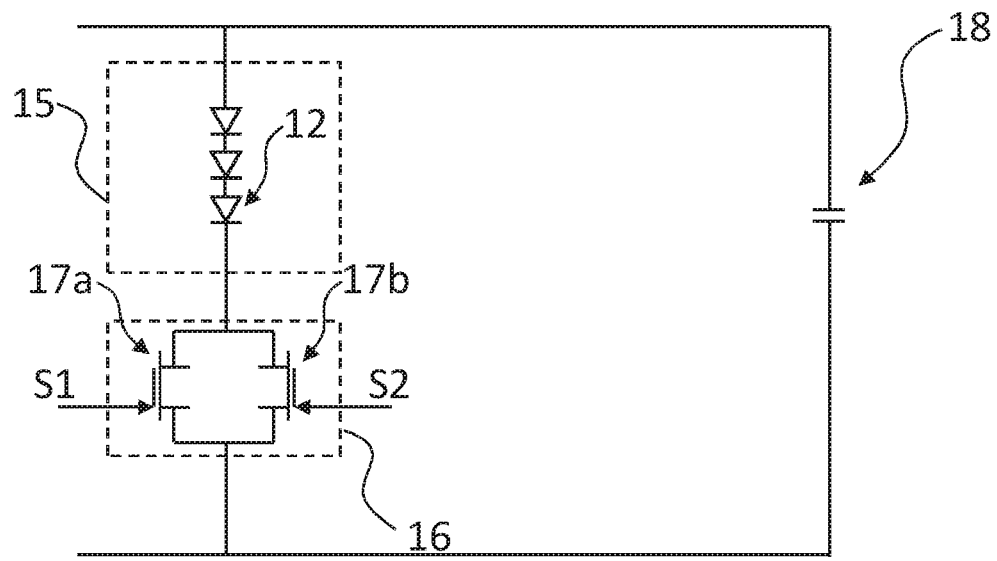

The Figures Show in:

FIGS. 1A and 1B schematic illustrations of exemplary embodiments of a measuring system and a lighting source with a measuring system, FIGS. 2 to 5 schematic illustrations of exemplary embodiments of LED lighting units, FIGS. 6A through 7B schematic illustrations of sender units and receiver units of measuring systems according to further exemplary embodiments, FIGS. 8A through 8D graphs of LED properties, and FIGS. 9, 10A and 10B schematic illustrations of a lighting source with a measuring system according to further exemplary embodiments.

The same or similar elements can be indicated with the same reference characters throughout the exemplary embodiments and figures. The illustrated elements and the size ratios thereof are not necessarily made to scale, rather individual elements such as layers, components, devices and regions may rather be shown with an exaggerated size for the purpose of better understanding.

FIG. 1A shows an exemplary embodiment for a measuring system 1 with a sender unit 10 and a receiver unit 20, by means of which an object 9 indicated with dotted lines in FIG. 1A and not associated with the measuring system 1 can be evaluated. The object 9 can e.g. be an object, one or multiple particles, e.g. of an aerosol, one or multiple molecules, e.g. of a gas, or another object to be examined by means of light.

The sender unit 10 is provided and configured to radiate at least one light pulse as a sender signal 11, as indicated by the arrow and the square-wave pulse in FIG. 1A. The square-wave shape of the pulse is merely exemplary and may have other shapes depending on the object 9 to be examined. Furthermore, the sender signal 11 can e.g. also have a pulse train, i.e. a plurality of pulses, instead of a single pulse and/or a pulse modulated in its amplitude.

The receiver unit 20 is provided and configured to receive a return signal 21, which comprises at least a part of the sender signal 11 reflected by the external object 9. The return signal 21 may deviate from the sender signal 11 through the interaction of the sender signal 11 with the object 9, e.g. with respect to the time profile and/or with respect to the spectral composition. Thus, the return signal 21 may correspond to an attenuated and/or at least partially frequency-shifted sender signal at least with respect to some spectral components.

In a method for operating the measuring system 1, the sender unit 10 thus sends at least one light pulse as a sender signal 11. The receiver unit 20 detects the return signal 21. For example, the method can be used to determine one or multiple parameters with respect to the sender signal 11 and/or the return signal 21, in order to thus be able to make conclusions on the object 9. For example, a time difference between the sender signal 11 and the return signal 21 and/or a wavelength shift between the sender signal 11 and the return signal 21 and/or a spectral change between the sender signal 11 and the return signal 21 can be determined. One or multiple state variables with respect to the object 9 can be derived from the one or more parameters determined from the return signal 21, e.g. a distance and/or a velocity and/or at least one or more velocity components and/or at least a part of a chemical and/or physical composition. Furthermore, the measuring system 1 may comprise an evaluation unit (not shown) provided and configured for the parameter determination. The measuring system 1 can have properties and features of a LIDAR system or be a LIDAR system, for example.

The measuring system 1 can be a part of a lighting source 2, as illustrated in FIG. 1B. The measuring system 1 and in particular the sender unit comprises at least two operating states here, one of which is an operating state configured for performing the stated measuring method, while another operating state is configured for continuously emitting light for ambient lighting. For example, the lighting source 2 can be part of a headlamp such as an automobile headlamp or part of a flashlight, e.g. in a cellular phone or a camera. As a result, it can be possible that no additional light source such as a laser needs to be used for the measuring system 1, but the means used for the lighting function in the form of the sender unit can also be used for the measuring system. As a result, it can be possible to integrate the measuring system 1 into an existing lighting source 2 in a comparatively simple manner.

Further features and configurations of the measuring system 1 and thus also of the lighting source 2 as well as of the method for operating the measuring system 1 are described in the following description and in conjunction with the following figures.

A sender unit 10 having at least one individually operable LED lighting unit 12 is used as a light source for generating the at least one light pulse as a sender signal in the measuring system 1. Some examples for LED lighting units 12 are shown in the FIGS. 2 to 5, which can be formed by LEDs 100 or by a part of an LED 100. The sender unit 10 can comprise one or multiple of the shown LED lighting units 12 or LEDs 100, wherein the present invention is not limited to the specific configuration of the illustrated exemplary embodiments for the LED lighting units 12.

Figure 2:
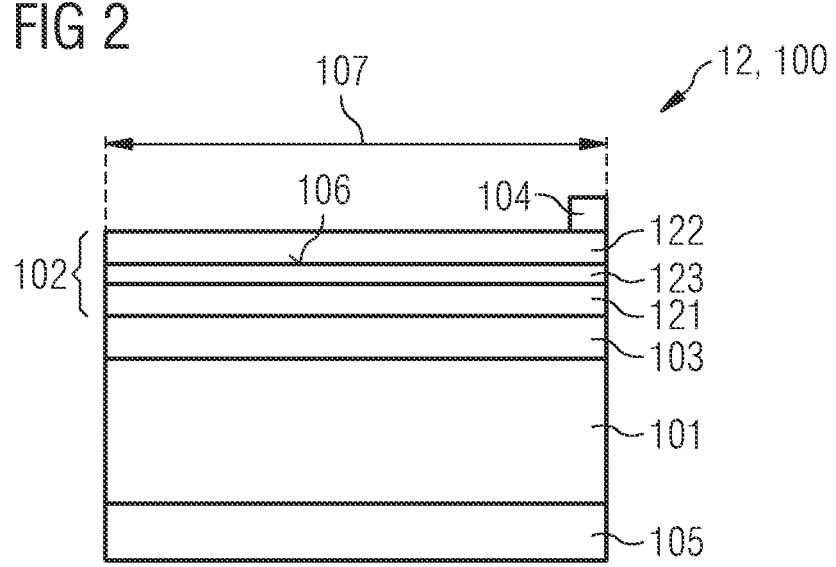

FIG. 2 shows an exemplary embodiment for a LED lighting unit 12 formed by an LED 100. The LED 100 is formed as an LED chip with a semiconductor layer sequence 102 applied on a substrate 101. Merely by way of example, two semiconductor layers 121, 122 are shown, between which an active layer 123 is arranged, which is configured and provided to generate light during operation of the light emitting diode 100.

For example, a semiconductor layer sequence 102 or at least an active layer 123 on the basis of $In_xGa_yAl_{1-x-y}As$ is suitable for a long-wave infrared to red radiation, a semiconductor layer sequence 102 or at least an active layer 123 on the basis of $In_xGa_yAl_{1-x-y}P$ is suitable for red to yellow radiation, and a semiconductor layer sequence 102 or at least an active layer 123 on the basis of $IN_xGa_yAl_{1-x-y}N$ is suitable for short-waved visible radiation, i.e. in particular in the range of green to blue light, and/or for UV radiation, with in each case $0 \leq x \leq 1$, $1 \leq y \leq 1$, and $x+y \leq 1$. Alternatively or in addition, the semiconductor layer sequence 102 or at least the active layer 123 may also comprise II-VI semiconductor compound material systems instead of the stated III-V semiconductor compound material systems, such as ZnO, ZnMgO, CdS, ZnCdS, MgBeO, and compounds and combinations thereof.

The semiconductor layer sequence 102 can be epitaxially deposited on to a growth substrate and be transferred to a carrier substrate such as the illustrated substrate 101 after the epitaxial growing process. Here, the substrate 101 can comprise or consist of a semiconductor material such as an above-described semiconductor compound material, or another suitable material. In particular, a growth substrate and/or the substrate 101 may for example include sapphire, GaAs, GaP, GaN, InP, SiC, Si and/or Ge or consist of such a material.

The semiconductor layer sequence 102 may comprise as an active layer 123 e.g. a conventional p-n-junction, a double hetero structure, a single quantum well (SQW) structure or a multi-quantum well (MQW) structure. The semiconductor layer sequence 102 may include further functional layers and functional regions in addition to the active layer 123, which are indicated by the layers 121, 122, e.g. p-doped or n-doped charge carrier transport layers, i.e. electron transport layers or hole transport layers, undoped or p- or n-doped confinement-, cladding- or waveguide layers as well as barrier layers, planarization layers, buffer layers and/or protective layers as well as combinations thereof. Furthermore, a mirror layer 103 can be arranged e.g. between the substrate 101 and the semiconductor layer sequence 102, as illustrated in FIG. 2. Furthermore, additional layers such as buffer layers, barrier layers and/or protective layers can be arranged perpendicular to the growth direction of the semiconductor layer sequence 102 e.g. around the semiconductor layer sequence 102, i.e. on the side surfaces of the semiconductor layer sequence 102, for example.

For the electrical contacting of the semiconductor layer sequence 102 and thus for the supply of current to the active layer 123, the electric contacts 104, 105 are provided in the form of electrode layers or electrode structures, the illustrated positions of which on the semiconductor layer sequence 102 and on the side of the substrate 101 facing away from the semiconductor layer sequence 102 are to be understood as merely exemplary.

The LED 100 shown in FIG. 2 represents the basic structure of a so-called thin film LED chip, in which the semiconductor layer sequence 102, after it was grown on to a growth substrate, is transferred from this growth substrate to a suitable carrier substrate, and in which the growth substrate is subsequently removed or at least thinned. Alternatively, the LED 100 may also comprise the growth substrate as the substrate 101, wherein here the mirror layer 103 can be omitted. Such an LED chip, which is mounted on a carrier by means of the growth substrate, can also be referred to as a so-called volume emitter.

FIG. 3 shows as LED lighting unit 12 formed as an LED 100, which is formed as a so-called flip chip. The flip chip is mounted on a carrier with the electric contacts 104, 105, so that light generated during operation is emitted through the substrate 101, which can be the growth substrate. For the rest, the LED 100 shown in FIG. 3 can comprise features as described in conjunction with FIG. 2.

FIG. 4 shows an exemplary embodiment for an LED 100, which is formed as a segmented LED and which comprises a segmented configuration of at least a part of the semiconductor layer sequence 102. In other words, the semiconductor layer sequence 102 is sub-divided into individual, individually operable luminous segments on the substrate 101, which can be a growth or carrier substrate, the segments forming a plurality of individually operable lighting units 12. For the rest, the LED 100 shown in FIG. 4 can comprise features as described in conjunction with FIG. 2. For the sake of clarity, electrical contacts are not shown. For individually controlling the individual LED lighting units 12, the substrate 101 can optionally be mounted on to a drive circuit carrier 110, which is indicated by the dashed line and which contains e.g. a suitable drive circuit or at least a part thereof. The drive circuit carrier 110 can e.g. be based on a silicon technique. Segmented LEDs are described e.g. in patent documents US 2015/0325598 A1 and US 2015/0333047 A1, the respective disclosures of which are in each case completely incorporated herein by reference.

The LED lighting units 12 shown in FIGS. 2 to 4 each have a characteristic longitudinal extent of less than or equal to 100 µm. In particular, each of the shown lighting units 12 can have a luminous area 106 with a characteristic longitudinal extent 107 of less than or equal to 100 µm. Alternatively or in addition, each of the shown lighting units 12 can have a surface area of less than or equal to $10^4$ µm$^2$. In particular, each of the shown lighting units can have a luminous area 106 of less than or equal to $10^4$ µm$^2$. As can be taken from the Figures or is described in the general part of the above description, the surface area and the longitudinal extent are measured in a plane which is parallel to a main extension direction of the active layer 123 of the semiconductor layer sequence 102 and thus perpendicular to an arrangement direction of the layers of the semiconductor layer sequence 102. The characteristic longitudinal extent 107 can, as described above in the general part of the description, be e.g. an edge length of a polygonal geometric shape on which the LED lighting unit 12 or the luminous area 106 is based. Furthermore, the characteristic longitudinal extent 107 can also be a maximum extent of the surface of the lighting unit 12 or of the luminous area 106 in a direction parallel to the main extension plane of the active layer 123, i.e. e.g. a surface diagonal or a diameter. In the exemplary embodiments shown in FIGS. 2 and 3, the specified dimensions can particularly also apply to the dimensions of the shown LEDs, while the dimensions indicated in the exemplary embodiment shown in FIG. 4 apply to the dimensions of each of the luminous segments.

The indicated dimensions are particularly advantageous in order to achieve a high bandwidth of greater than or equal to 100 MHz, so that the generation of light pulses with a pulse length of less than or equal to 10 ns are possible. The general dependence of the switching times of an LED of the applied operating current C is shown in FIG. 8A by means of the rise time tr(10-90) of an amplitude value of 10% to an amplitude value of 90% and by means of the fall time tf(90-10) from an amplitude value of 90% to an amplitude value of 10% for a blue-emitting LED chip with a luminous area of 1 mm$^2$. It is easily discernable that both the rise time and the fall time of the switching process get smaller as the operating current increases and thus as the current density increases.

By making the luminous area of an LED chip smaller, e.g. by means of making the chip size smaller or by sub-dividing the chip into individually controllable luminous segments, an increase of the maximum possible current density and thus a corresponding further shortening of the switching times can be achieved. This can also be taken from the relations shown in FIGS. 8B through 8D. FIG. 8B shows the optical rise time ORT or the optical fall time, indicated with "t_rise" and "t_fall", depending on the multiplicative inverse of the root of the pulse peak current PPC for an infrared-emitting LED chip having a luminous area of 1 mm$^2$. FIG. 8C shows the corresponding relations for a similar chip with an edge length of approximately 200 µm, which is operated to be driven by voltage. FIG. 8D shows the corresponding relations for the same chip as in FIG. 8C, in this case depending on the pulse current, wherein the chip used for this measurement was operated with an improved control, inter alia driven by current and with a short-circuiting circuit for turning-off.

Thus, independently of the semiconductor material used for the LED lighting unit, a sufficiently short switching time can be achieved to realize pulse lengths of less than or equal to 10 ns and thus a bandwidth of greater than or equal to 100 MHz by an above-described further reduction of the dimensions of the LED lighting unit, compared to the LED chips in FIGS. 8A to 8D used for the measurements, to a longitudinal size of less than or equal to 100 µm and/or a surface area of less than or equal to $10^4$ µm².

If the measuring system 1 is e.g. used in a lighting source 2 as the one shown in FIG. 1B, it can be advantageous when the at least one LED lighting unit 12 comprises a wavelength conversion substance, which is provided and configured to convert part of the light emitted by the LED lighting unit 12, also referred to as primary light, into light different from the primary light, which is also referred to as secondary light, so that a mixed-colored luminous impression can be suggested. For a conventional lighting source 2, in particular a white luminous impression can be advantageous, for the generation of which e.g. at least a blue-emitting LED lighting unit 12 can be used in combination with a wavelength conversion substance, which converts part of the blue primary light into yellow secondary light and/or green and red secondary light. FIG. 5 shows a corresponding exemplary embodiment for an LED 100, which merely by way of example is formed as segmented LED as described in conjunction with FIG. 4 and which comprises a wavelength conversion substance 111 on the LED lighting units 12. Furthermore, the other above-described LED configurations can be combined with a wavelength conversion substance 111 as well.

With respect to the pulse length of the light pulses of less than or equal to 10 ns generated by the LED lighting units 12, it is advantageous if the wavelength conversion substance 111 has excitation and deactivation times of likewise less than or equal to 10 ns. To that end, the wavelength conversion substance 111 can e.g. be based on a luminous substance with quantum dots. In this case, the mixed light emitted by the LED lighting units 12 with the wavelength conversion substance 111 can be detected by the receiver unit.

If a wavelength conversion substance 111 is used that has an excitation and/or deactivation time of more than 10 ns, the wavelength conversion substance 111 glows after in the generation of light pulses with a pulse length of less than or equal to 10 ns, so that only the primary component of the emitted light can be used for the measuring system. It is advantageous in this case if the receiver unit comprises a filter, which is impermeable to the secondary light generated by the wavelength conversion substance 111.

As an alternative to the generation of mixed light by use of a wavelength conversion substance, the sender unit can also comprise an LED lighting unit emitting in different colors, e.g. at least one LED lighting unit emitting red light, at least one LED lighting unit emitting green light and at least one LED lighting unit emitting blue light.

Figure 6A:
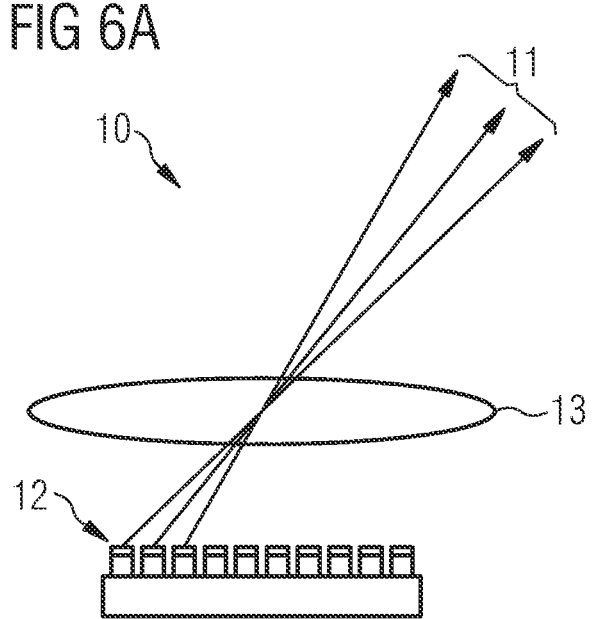
Figure 6B:
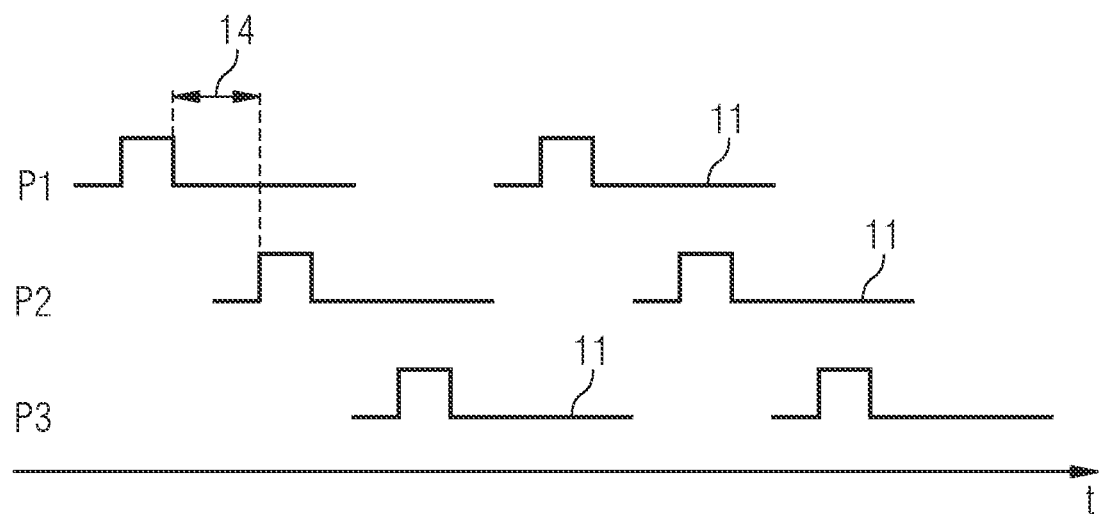

FIG. 6A shows another exemplary embodiment for a sender unit 10 for the measuring system 1, which merely by way of example comprises a segmented LED, described in conjunction with FIGS. 4 and 5, with a plurality of LED lighting units 12 individually operable and formed by a plurality of luminous segments. The LED lighting units 12 form individual pixels, which can be activated sequentially, for example. The sender unit 10 further comprises an optics element 13, which may e.g. comprise a lens and which is provided for bundling and/or guiding the sender signal 11. Merely by way of example, a sender signal 11 is shown in FIG. 6A by means of the indicated light beams, which comprises light pulses of three of the LED lighting units 12. One possible time sequence of the light pulses of the sender signal 11 along the time axis t is shown in FIG. 6B. The sender signal 11 comprises a plurality of light pulses generated successively by the different LED lighting units indicated with P1, P2 and P3, wherein the time difference 14 between two directly successive light pulses is selected merely by way of example corresponding to the so-called "round trip time" in such a way that a light pulse can be output, reflected, detected and processed before the next light pulse is output. By the sequential activation of the individual pixels, energy storage close to the segmented chip is unproblematic. As the light pulses are very short and a current impression is effected only over a very small surface area, very high power densities are possible locally in the individual LED lighting units 12 through a very high maximum current density, as heat dissipation from the chip is not a problem. Thus, each LED lighting element 12 can emit with a very high power density in a very narrow solid angle range. As an alternative to the shown individual pulses, the sender signal 11 can also comprise in each case multiple light pulses in the form of pulse trains generated by the respective LED lighting units 12.

As indicated in FIG. 6A, the sender unit 10 can comprise a plurality of LED lighting units 12 emitting in different solid angle ranges, so that a bigger solid angle range can be covered by one and the same sender unit 10 compared to only one single light source. As a result, a suitable activation and targeted radiation of a target object to be measured can be achieved. As an alternative, it is also possible that the sender unit 10 comprises a plurality of LED lighting units 12, which radiate in a same solid angle range. As a result, it can be achieved that the individual LED lighting units 12 are exposed to fewer thermal stress even when operated with a high current density, since different lighting units 12 can be used for successive light pulses radiated into the same solid angle range. Here, the respective return signals can be summed-up, whereby an improvement of the signal-to-noise ration can be achievable. Furthermore, it can also be possible that a plurality of LED lighting units 12 is used simultaneously for generating in each case one or multiple light pulses emitted into a same or into a different solid angle range.

Thus, it can be particularly advantageous to sequentially pulse the LED lighting units 12 in a so-called rolling process in order to keep the peak current consumption low. Experiments have shown, for example, that in a segmented LED with 100 LED lighting units and a suitable optics for covering the same field of view, only current pulses of 300 mA are required, while current pulses of up to 30 A would have been required in a comparable system with a laser as the only light source.

The sender unit 10 shown in FIG. 6A can be integrated e.g. in a cellular phone as a part of the measuring system in a lighting source and be used as a flashlight source as well as light source for the measuring system. The short light pulses output by the sender unit 10 in the range of several nanoseconds, during the measuring method, can e.g. be used for a 3D object recognition and/or for distance measurement. Accordingly, intensity of the flashlight can be controlled in accordance with the distance of the measured object. Here, the sender unit 10 can preferably comprise, as described in conjunction with FIG. 5, luminous segments with a wavelength conversion substance or also luminous segments of different colors for the generation of the desired mixed-colored luminous impression of the flashlight. As described, it is not necessary to operate all LED lighting units 12 at the same time, but it is sufficient to operate few of the LED lighting units 12 with a very high current density ("overdrive" or "high current mode") compared to a continuous operation, since only light pulses in the range of nanoseconds are generated. Depending on the interplay with the associated camera, as an alternative, a so-called burst mode is possible, wherein in each case other groups of LED lighting elements 12 are operated simultaneously in the individual burst sequences, in order to keep the effective current per LED lighting unit low.

The measuring system described herein can e.g. also be integrated in an RGB-LED display, in which the entire display backlighting can be used as a sender unit e.g. for time-of-flight measurements. Just as well, also other micropixelated light sources are possible as the sender unit.

FIGS. 7A and 7B show exemplary embodiments for receiver units 20, which just like the sender unit 10 of FIG. 6A also comprise an optional optics element 13, e.g. with a lens, for light bundling and light directing of the return signal 21. As an alternative or in addition, the optics element 13 can also comprise a filter or be made of a filter, which is impermeable to secondary light generated by a wavelength conversion substance.

The receiver unit 20 shown in FIG. 7A comprises exactly one detector unit 22, which is used for the detection of a plurality of return signals 21 and thus, using a suitable optics element 13, for the detection of return signals 21 from the entire solid angle range for be measured. The individual light pulses for each pixel can be summed-up then in the burst mode, for example.

As an alternative, the receiver unit 20, as shown in FIG. 7B, can comprise a plurality of detector units 22 in the form of a detector array for the detection of a plurality of return signals 21. Possibly by using a suitable optics element 13, an improvement of the directional resolution can be achieved.

The one or more detector units 22 can preferably be formed by one or more photodiodes or photodiode segments or by a CMOS sensor. In particular, the receiver unit 20 can comprise or be a camera chip or a time-of-flight camera of a high-speed global shutter camera, in particular when such detectors are already installed in the application for which the measuring system is to be used. In the use of a high-speed global shutter camera, a fast shutter is a prerequisite to ensure the required time resolution.

Further exemplary embodiments of a lighting source with a measuring system are schematically illustrated by means of FIGS. 9 and 10.

FIG. 9 shows an exemplary embodiment for a sender unit 10 of the measuring system 1. The sender unit 10 includes multiple LED lighting units 12 which are each arranged in clusters 15. As schematically indicated, the individual LED lighting units 12 of the cluster 15 each emit in the same solid angle range, so that depending on the number of LED lighting units 12 per cluster 15, a certain light output and thus an adjustable luminous range in this solid angle range results. For example, between 10 and 100, inclusive, LED lighting units 12 are arranged per cluster 15. A light output per cluster 15 can e.g. be between 0.2 and 5 W, in particular 1 W.

The LED lighting units 12 of different clusters 15 are, as schematically indicated, further configured to radiate in different solid angle ranges. Depending on the light output of the individual cluster 15, a particularly asymmetric illumination pattern of the sender unit 10 can be set. Such pattern can be provided e.g. when the sender unit 10 is used as a part of a lighting source 2 as in a vehicle (head)lamp.

The overall light output of the lighting source 2 in this case is e.g. between 1 W and 25 W, in particular 10 W.

If the sender unit 10 has a first operating state for operating the indicated measuring method and a second operating state for continuously radiating light, a visual range obtained by a driver by lighting the surroundings in the second operating state can correspond to a machine visual range by the indicated measuring method in the first operating state. In particular, it can be ensured in this way that a depth map generated by the measuring method corresponds to an actually visible region. The individual cluster 15 can be individually controlled, e.g. in a time division multiplexing manner, so that the space can be "scanned" by performing the stated measuring method.

The individual clusters 15 can be sub-divided into sub-groups, e.g. to minimize a switching current as described hereinafter by means of FIGS. 10, 10b, and to achieve high rise times of the current pulse. In particular, the clusters 15 are sub-divided into sub-groups in such a way that switching currents for operating the respective cluster 15 or sub-groups are significantly below 10 A. In an advantageous manner, a limitation of the rise time of the current pulse can be kept low due to the respective line inductance.

Exemplary embodiments of a control circuit of a lighting source 2 with the sender unit 10 are shown by means of FIGS. 10a and 10b.

LED lighting units 12 emitting in the same solid angle are in turn arranged in a cluster 15. According to FIG. 10a, the LED lighting units 12 of the cluster 15 can be connected in parallel. As a result, a voltage for operating the lighting source 2 can be selected to be relatively low, and a pulse mode of the LED lighting unit 12 can be performed at a higher frequency due to the low-inductive connection. Preferably, however, the LED lighting units 12 are connected in series as shown in FIG. 10b, since a current to be switched per cluster 15 can be kept low in this way.

The cluster 15 is in each case connected in one strand in series with a current control unit 16 including a FET switch 17a as well as a current source 17b. The FET switch 17a and the current source 17b are connected in parallel here and configured to set a current for operating the cluster 15 depending on the operating state of the current control unit 16. As a result, the current control unit 16 comprises a control input for receiving a control signal S1, S2, depending on which the FET switch 17a or the current source 17b is selected for impressing the current in the strand. The respective other unit 17b, 17a is open-circuited then, by way of example. A corresponding control signal S1, S2 can be provided, by way of example, by a microprocessor 19 assigned to the lighting source 2.

For example, the cluster 15 is operated in a pulsed manner by the FET switch 17a in one operating state of the current control unit 16, in order to perform the stated measuring method. A current for operating in each case one LED lighting unit 12 can e.g. be between 0.2 mA and 5 mA, in particular 1 mA. Accordingly, a current in the strand can be between 0.2 A and 5 A, in particular 1 A. A pulse length is less than or equal to 10 ns here. Instead of the FET switch 17a, through which a current is not limited in the respective strand, it is also possible to use a power source, e.g. for reasons of eye security.

The strand with the cluster 15 as well as the current control unit 16 is connected in parallel to a storage capacitor 18. This storage capacitor can be provided to store energy for operating the cluster 15 locally in the vicinity of the cluster 15. In this way, an operation of the LED lighting units 12 can be ensured even with short, high current impulses as in the pulse mode of the stated measuring method. A capacity of the storage capacitor is e.g. between 10 and 100 nF inclusive in this context.

In contrast to what is stated above, the control circuit can also be configured to control a plurality of clusters (15), in particular to control all clusters (15) of a lighting source (2). To that end, the individual strands per cluster (15) are to be connected in parallel, in particular. In this context, in each case one storage capacitor (18) can be provided per cluster (15). As an alternative, a common storage capacitor (18) can be used for multiple clusters (15).

According to further exemplary embodiments, the exemplary embodiments and features described in conjunction with the Figures can also be combined with one another. Furthermore, the exemplary embodiments shown in conjunction with the Figures can comprise additional or alternative features according to the description in the general part.

The invention can also be described by the following concepts:

1. Measuring system (1), comprising:
    a sender unit (10) with at least one individually operable LED lighting unit (12) with a luminous area (106), which has a characteristic longitudinal extent (107) of less than or equal to 100 µm and/or a surface area of less than or equal to $10^4$ µm$^2$, wherein the LED lighting unit (12) is configured to emit at least one light pulse as a sender signal (11) during operation, and
    a receiver unit (20) with at least one detector unit (22) for receiving a return signal (21), which comprises at least part of the sender signal (11) reflected by an external object.
2. Measuring system (1) of concept 1, wherein the lighting unit (12) has a luminous area (106) with a rectangular basic shape and the characteristic longitudinal extent (107) is an edge length of the rectangular basic shape.
3. Measuring system (1) of one of the preceding concepts, wherein the at least light pulse has a pulse length of less than or equal to 10 ns.
4. Measuring system (1) of one of the preceding concepts, wherein the sender signal (11) comprises a plurality of successively generated light pulses.
5. Measuring system (1) according to one of the preceding concepts, wherein the sender signal (11) comprises an overall duration of less than or equal to 100 µs.
6. Measuring system (1) according to one of the preceding concepts, wherein the at least one LED lighting unit (12) is formed by an LED (100).
7. Measuring system (1) according to one of the preceding concepts, wherein the sender unit (10) comprises a segmented LED (100), which comprises a plurality of individually operable LED lighting units (12) in the form of luminous segments.
8. Measuring system (1) according to one of the preceding concepts, wherein the sender unit (10) comprises a plurality of LEDs (100) each having at least one LED lighting unit (12).
9. Measuring system (1) according to one of the preceding concepts, wherein the sender unit (10) is configured to successively emit light pulses during operation of various LED lighting units (12).
10. Measuring system (1) according to one of the preceding concepts, wherein the sender unit (10) comprises a plurality of LED lighting units (12), which emit in different solid angle ranges.
11. Measuring system (1) according to one of the preceding concepts, wherein the sender unit (10) comprises a plurality of LED lighting units (12), which emit in a same solid angle range.
12. Measuring system (1) according to one of the preceding concepts, wherein the sender unit (10) comprises a wavelength conversion substance (111), which is configured to convert at least part of a primary light generated by the LED lighting unit (12) during operation into secondary light different from the primary light.
13. Measuring system (1) according to concept 12, wherein the wavelength conversion substance (111) has an excitation and deactivation time of in each case less than or equal to 10 ns.
14. Measuring system (1) according to concept 12, wherein the wavelength conversion substance (111) has an excitation and/or deactivation time of more than 10 ns and the receiver unit (20) comprises a filter, which is impermeable to the secondary light.
15. Measuring system (1) according to one of concepts 1 to 14, wherein the receiver unit (20) comprises exactly one detector unit (22) for the detection of a plurality of return signals (21).
16. Measuring system (1) according to one of concepts 1 to 14, wherein the receiver unit (20) comprises a plurality of detector units (22) for the detection of a plurality of return signals (21).
17. Measuring system (1) according to one of the preceding concepts, wherein the measuring system (1) is a LIDAR system.
18. Measuring system (1) according to one of the preceding concepts, including a storage capacitor (18) and a current control unit (16), wherein
    the at least one LED lighting unit (12) is connected in a strand in series to the current control unit (16), and
    the storage capacitor (18) is connected in parallel to the strand having the at least one LED lighting unit (12) and the current control unit (16), wherein
    the current control unit (16) is configured to set a current for operating the at least one LED lighting unit (12) in such a way that the at least one LED lighting unit (12) is operated with a direct current in a first operating state of the current control unit (16) and with a pulsed current in a second operating state of the current control unit (16).
19. Measuring system (1) according to one of the preceding concepts, wherein
    the sender unit (10) comprises multiple clusters (15) each including a plurality of LED lighting units (12), wherein
    the LED lighting units (12) emit in a same solid angle range per cluster (15), and
    the LED lighting units (12) of different clusters (15) each emit in different solid angle ranges.
20. Measuring system (1) according to one of the preceding concepts, wherein one strand having one current control unit (16) is provided per cluster (15), which current control unit (16) is in each case connected in series with the LED lighting units (12) of the cluster (15) and configured to set the current for operating the LED lighting unit (12) of the cluster (15).
24. Measuring system (1) according to one of the preceding concepts, wherein
    the sender unit (10) is formed as a pixelated radiation source having at least two pixels as LED lighting units (2).

25. Measuring system (1) according to one of the preceding concepts, wherein
the receiver unit (20) is configured to detect electromagnetic radiation emitted by the sender unit (10), in particular by the pixelated radiation source and reflected in measuring regions.
26. Measuring system (1) according to one of the preceding concepts, including a control unit, which is configured to operate the sender unit (10) and to receive electric signals of the receiver unit (20).
27. Measuring system (1) according to one of the preceding concepts 24 to 26, wherein
different measuring regions can be illuminated by means of the pixelated radiation source with electromagnetic radiation having pair-wise different properties, i.e. in particular in each case different properties.
28. Measuring system (1) according to one of the preceding concepts 24 to 27, in which the pixels of the pixelated radiation source can be operated in each case individually by means of the control unit, and in which the pixels emit electromagnetic radiation with pairwise different properties, i.e. in particular in each case different properties.
29. Measuring system (1) according to one of the preceding concepts, including a projection lens, in which
the projection lens is arranged downstream of the sender unit (10), in particular the pixelated radiation source, in an emission direction
the projection lens assigns electromagnetic radiation emitted by the sender unit (10), in particular by the pixelated radiation source, to the measuring regions, wherein
the electromagnetic radiation of at least one pixel is assigned to each measuring region.
30. Measuring system (1) according to one of the preceding concepts, in which the radiation emitted by the sender unit (10), in particular by the pixels, is pulse-width modulated and the different properties include the following parameters: amplitude, frequency, phase and/or pulse duration.
31. Measuring system (1) according to one of the preceding concepts, in which the receiver unit (20) includes a wavelength filter, wherein the wavelength filter at least partially reflects and/or absorbs electromagnetic radiation of a wavelength range which is different from the wavelength range of the electromagnetic radiation emitted by the sender unit (10).
32. Measuring system (1) according to one of the preceding concepts, in which the receiver unit (20) comprises a plurality of detection regions, which are arranged next to one another in a lateral plane.
33. Measuring system (1) according to one of the preceding concepts, in which
the sender unit (10), in particular the pixelated radiation source, is configured to emit electromagnetic radiation in the visible wavelength range, and
the receiver unit (20) is configured to detect electromagnetic radiation in the visible wavelength range.
34. Measuring system (1) according to one of the preceding concepts, in which
the sender unit (10), in particular the pixelated radiation source, is configured to emit electromagnetic radiation in multiple wavelength regions, and
the receiver unit (20) includes a wavelength filter, wherein the wavelength filter is configured to be reflecting and/or absorbing for at least a part of the electromagnetic radiation emitted by the sender unit (10), in particular by the pixelated radiation source.
35. Measuring system (1) according to one of the preceding concepts, in which the sender unit (10), in particular the pixelated radiation source, is configured to emit electromagnetic radiation in multiple wavelength regions, wherein electromagnetic radiation generated in the sender unit (10), in particular the pixelated radiation source, is at least partially converted into electromagnetic radiation of another wavelength range by means of a converter.
36. Measuring system (1) according to one of the preceding concepts, in which the control unit is configured to determine the average distance of the measuring regions to the measuring system (1).
37. Use of at least one individually operable LED lighting unit (12) as a sender unit (10) in a measuring system (1), wherein the LED lighting unit (12) has a luminous area (106) with a characteristic longitudinal extent (107) of less than or equal to 100 μm and/or a luminous area (106) of less than or equal to 104 μm2 and is configured to emit at least one light pulse as a sender signal (11) during operation.
38. Method for operating a measuring system (1) according to one of concepts 1 to 36, in which
the sender unit (10) outputs at least one light pulse as a sender signal (11), and
the receiver unit (20) detects the return signal (21).
39. Method according to the preceding concept, wherein the measuring system (1) includes the following:
a sender unit (10) formed as a pixelated radiation source having at least two pixels,
a projection lens, which is arranged downstream the sender unit (10) in the radiation direction,
a receiver unit (20), and
a control unit, which is configured to operate the sender unit (10) and to receive electric signals from the receiver unit (20), wherein in the method
different measuring regions are illuminated with electromagnetic radiation with pairwise different properties, i.e. in particular in each case different properties,
at least a part of the electromagnetic radiation is reflected in the measuring regions,
at least a part of the reflected electromagnetic radiation is detected by means of the receiver unit (20), and
in each case the average distance of the measuring regions to the measuring system (1) is determined by means of the control unit.
40. Method according to one of the preceding concepts 38 or 39, wherein the electromagnetic radiation reflected in the measuring regions can be and in particular is unambiguously assigned to the measuring regions by means of the properties.
41. Method according to one of the preceding concepts 38 to 40, wherein the sender unit (10), in particular the pixelated radiation source, is operated by the control unit in such a way that the emitted radiation, in particular the radiation emitted by the pixels, is pulse-width modulated and the different properties include the following parameters: amplitude, frequency, phase and/or pulse duration.
42. Method according to one of the preceding concepts 38 to 41, wherein a runtime is measured by means of the control unit for determining the distance, wherein the runtime is the time period starting from the emission of the electromagnetic radiation, in particular the electromagnetic radiation of a pixel, until the detection of the reflected electromagnetic radiation, in particular the reflected electromagnetic radiation that can unambiguously be assigned to the pixel.

43. Method according to one of the preceding concepts 38 to 42, wherein multiple pixels of the pixelated radiation source are operated simultaneously.

44. Method according to one of the preceding concepts 38 to 43, wherein the ambient light is measured by means of the receiver unit (20) before the measuring regions are illuminated by means of the sender unit (10), in particular the pixelated radiation source.

45. Method according to one of the preceding concepts 38 to 44, wherein
    the receiver unit (20) comprises a plurality of detection regions, and
    at least one measuring region is projected on the detection regions by means of an objective lens.

46. Method according to the preceding concept,
    wherein the signals detected by means of the receiver unit (20) are used for taking a picture of at least one measuring region and for determining the distance.

47. Lighting source (2) with a measuring system (1) according to one of the concepts 1 to 33, wherein the sender unit (10) comprises at least two operating states, one of which is configured as an operating state for performing the method according to one of the preceding concepts 22 to 46, and another operating state is configured to continuously emit light for ambient lighting.

The invention is not limited to the exemplary embodiments by the description of these exemplary embodiments. The invention rather includes any feature as well as any combination of features, particularly including any combination of features in the patent claims, even if this feature or this combination is per se not explicitly stated in the patent claims or in the exemplary embodiments.

LIST OF REFERENCE CHARACTERS

1 Measuring system
2 Lighting source
9 Object
10 Sender unit
11 Sender signal
12 LED lighting unit
13 Optics element
14 Time interval
15 Cluster
16 Current control unit
17a, 17b Switch/Source
18 Storage capacitor
19 Microprocessor
20 Receiver unit
21 Return signal
22 Detector unit
100 LED
101 Substrate
102 Semiconductor layer sequence
103 Mirror layer
104, 105 Electric contacts
106 Luminous area
107 Longitudinal extent
110 Drive circuit carrier
111 Wavelength conversion substance
121, 122 Semiconductor layer
123 Active layer

The invention claimed is:

1. A measuring system, comprising:
   a sender unit comprising a plurality of light emitting diodes (LEDs) each having at least one LED lighting unit of a plurality of LED lighting units, each LED lighting unit including a luminous area having a characteristic longitudinal extent of less than or equal to 100 µm and/or a surface area of less than or equal to $10^4$ µm$^2$, wherein the sender unit is configured to successively emit light pulses separated by a time interval during operation of various LED lighting units of the plurality of LED lighting units;
   a receiver unit with at least one detector unit for receiving a first return signal comprising at least a part of a first light pulse of the light pulses reflected by an external object and a second return signal comprising at least a part of a second light pulse of the light pulses reflected by the external object;
   wherein the time interval is selected based on i) a round trip time for the first light pulse to reach the external object and be received as the first return signal at the receiver unit, or ii) a distance between the measuring system and the external object; and
   wherein the sender unit comprises a wavelength conversion substance configured to convert at least part of a primary light generated by the plurality of LED lighting units during operation into a secondary light different from the primary light, wherein the wavelength conversion substance has an excitation time of less than or equal to 10 ns and a deactivation time of less than or equal to 10 ns.

2. The measuring system according to claim 1, wherein the luminous area of each LED lighting unit has a rectangular basic shape and the characteristic longitudinal extent is an edge length of the rectangular basic shape.

3. The measuring system according to claim 1, wherein the first light pulse has a pulse length of less than or equal to 10 ns.

4. The measuring system according to claim 1, wherein the first light pulse is emitted by a first LED lighting unit of the plurality of LED lighting units and the second light pulse is emitted by a second LED lighting unit of the plurality of LED lighting units.

5. The measuring system according to claim 1, wherein the sender unit comprises a segmented LED, wherein the plurality of LED lighting units are in a form of luminous segments and are individually operable.

6. The measuring system according to claim 1, wherein the plurality of LED lighting units emit in different solid angle ranges.

7. The measuring system according to claim 1, wherein the plurality of LED lighting units emit in a same solid angle range.

8. The measuring system according to claim 1, wherein the sender unit comprises a wavelength conversion substance, which is configured to convert at least part of a primary light generated by the plurality of LED lighting units during operation into a secondary light different from the primary light, wherein the wavelength conversion substance has an excitation and/or deactivation time of more than 10 ns and the receiver unit comprises a filter, which is impermeable to the secondary light.

9. The measuring system according to claim 1, wherein the receiver unit comprises exactly one detector unit for detection of a plurality of return signals.

10. The measuring system according to claim 1, wherein the receiver unit comprises a plurality of detector units for detection of a plurality of return signals.

11. The measuring system according to claim 1, wherein the measuring system is a LIDAR system.

12. The measuring system according to claim 1, further comprising a storage capacitor and a current control unit, wherein the plurality of LED lighting units are connected in a strand in series to the current control unit, the storage capacitor is connected in parallel to the strand having the plurality of LED lighting units and the current control unit, and the current control unit is configured to set a current for operating the plurality of LED lighting units in such a way that the plurality of LED lighting units are operated with a direct current in a first operating state of the current control unit and with a pulsed current in a second operating state of the current control unit.

13. The measuring system according to claim 1, wherein the sender unit comprises multiple clusters each including a subset of the plurality of LED lighting units, each subset of the plurality of LED lighting units in a same cluster of the multiple clusters emits in a same solid angle range, and each subset of the plurality of LED lighting units in a different cluster of the multiple clusters emits in different solid angle ranges.

14. The measuring system according to claim 13, wherein one strand having one current control unit is provided per cluster, wherein the current control unit is in each case connected in series with the subset of the plurality of LED lighting units of the cluster and configured to set a current for operating the subset of the plurality of LED lighting units of the cluster.

15. A method of using a plurality of LED lighting units as a sender unit in a measuring system, wherein each of the plurality of LED lighting units has a luminous area with a characteristic longitudinal extent of less than or equal to 100 µm and/or a luminous area of less than or equal to $10^4$ µm$^2$ and wherein the sender unit is configured to emit at least one light pulse as a sender signal during operation.

16. A method for operating a measuring system, comprising:

emitting, by a sender unit, light pulses separated by a time interval, wherein the sender unit comprises a plurality of light emitting diodes (LEDs) each having at least one LED lighting unit of a plurality of LED lighting units, each LED lighting unit including a luminous area having a characteristic longitudinal extent of less than or equal to 100 µm and/or a surface area of less than or equal to $10^4$ µm$^2$; and receiving, by a receiver unit, a first return signal comprising at least a part of a first light pulse of the light pulses reflected by an external object and a second return signal comprising at least a part of a second light pulse of the light pulses reflected by the external object;

wherein the time interval is selected based on i) a round trip time for the first light pulse to reach the external object and be received as the first return signal at the receiver unit, or ii) a distance between the measuring system and the external object; and wherein the sender unit comprises a wavelength conversion substance configured to convert at least part of a primary light generated by the plurality of LED lighting units during operation into a secondary light different from the primary light, wherein the wavelength conversion substance has an excitation time of less than or equal to 10 ns and a deactivation time of less than or equal to 10 ns.

17. A lighting source with the measuring system according to claim 1, wherein the sender unit comprises at least two operating states, one operating state corresponding to the sender unit being configured to successively emit light pulses separated by the time interval during operation of various LED lighting units of the plurality of LED lighting units, and a different operating state corresponding to the sender unit being configured to continuously emit light for ambient lighting.

* * * * *